United States Patent
Yang et al.

(10) Patent No.: US 10,608,292 B2
(45) Date of Patent: Mar. 31, 2020

(54) BATTERY MODULE HAVING STRUCTURE IN WHICH BATTERY MANAGEMENT SYSTEM IS DIRECTLY CONNECTED TO TERMINAL PLATES

(71) Applicant: LG CHEM, LTD., Seoul (KR)

(72) Inventors: Seung Min Yang, Daejeon (KR); Hyoung Chul Yoon, Daejeon (KR); Chang Wook Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 63 days.

(21) Appl. No.: 15/307,317

(22) PCT Filed: Jul. 5, 2016

(86) PCT No.: PCT/KR2016/007220
§ 371 (c)(1),
(2) Date: Oct. 27, 2016

(87) PCT Pub. No.: WO2017/014449
PCT Pub. Date: Jan. 26, 2017

(65) Prior Publication Data
US 2017/0133723 A1 May 11, 2017

(30) Foreign Application Priority Data

Jul. 21, 2015 (KR) .......................... 10-2015-0102831

(51) Int. Cl.
*H01M 10/00* (2006.01)
*H01M 10/42* (2006.01)
(Continued)

(52) U.S. Cl.
CPC ......... *H01M 10/425* (2013.01); *H01M 2/105* (2013.01); *H01M 2/1077* (2013.01); *H01M 2/204* (2013.01); *H01M 2/206* (2013.01); *H01M 10/482* (2013.01); *H01M 10/613* (2015.04); *H01M 10/643* (2015.04); *H01M 2/022* (2013.01); *H01M 10/6553* (2015.04); *H01M 2010/4271* (2013.01); *H01M 2220/20* (2013.01); *H01M 2220/30* (2013.01)

(58) Field of Classification Search
CPC . H01M 2/1077; H01M 10/425; H01M 10/482
See application file for complete search history.

(56) References Cited

U.S. PATENT DOCUMENTS

2008/0213652 A1* 9/2008 Scheucher ................ B60L 8/00
429/62
2010/0255355 A1* 10/2010 Park ...................... H01M 2/105
429/91
2016/0204398 A1 7/2016 Moon et al.

FOREIGN PATENT DOCUMENTS

EP 2343752 A2 7/2011
EP 3 035 061 A1 6/2016
(Continued)

OTHER PUBLICATIONS

Machine translation of KR 2015-0076913, obtained Nov. 2017 (Year: 2015).*
(Continued)

*Primary Examiner* — Nicholas P D'Aniello
(74) *Attorney, Agent, or Firm* — Birch, Stewart, Kolasch & Birch, LLP

(57) ABSTRACT

Disclosed herein is a battery module including a battery cell stack configured to have a structure in which a plurality of battery cells is arranged such that the battery cells are adjacent to each other laterally, a pair of cell frames mounted to opposite ends of the battery cell stack, terminal plates for electrically connecting electrode terminals of the battery cells to each other, and a battery management system (BMS) mounted to one side surface of the battery cell stack in the state in which the BMS is directly connected to the terminal plates.

17 Claims, 3 Drawing Sheets

(51) Int. Cl.
*H01M 2/10* (2006.01)
*H01M 10/643* (2014.01)
*H01M 2/20* (2006.01)
*H01M 10/613* (2014.01)
*H01M 10/48* (2006.01)
*H01M 2/02* (2006.01)
*H01M 10/6553* (2014.01)

(56) References Cited

FOREIGN PATENT DOCUMENTS

| | | |
|---|---|---|
| JP | 2001-266825 A | 9/2001 |
| JP | 2008-97942 A | 4/2008 |
| JP | 2009-64919 A | 3/2009 |
| JP | 2010-504623 A | 2/2010 |
| JP | 2010-277795 A | 12/2010 |
| JP | 2011-216366 A | 10/2011 |
| JP | 2014-127418 A | 7/2014 |
| JP | 2015-88493 A | 5/2015 |
| KR | 10-2015-0025241 A | 3/2015 |
| KR | 10-2015-0034495 A | 4/2015 |
| KR | 10-2015-0076913 A | 7/2015 |

OTHER PUBLICATIONS

Machine translation of JP 2010-277795, obtained Mar. 11, 2019 (Year: 2010).*
Machine translation of JP 2009-064919, obtained Sep. 17, 2019 (Year: 2009).*

* cited by examiner

[FIG. 1]
PRIOR ART
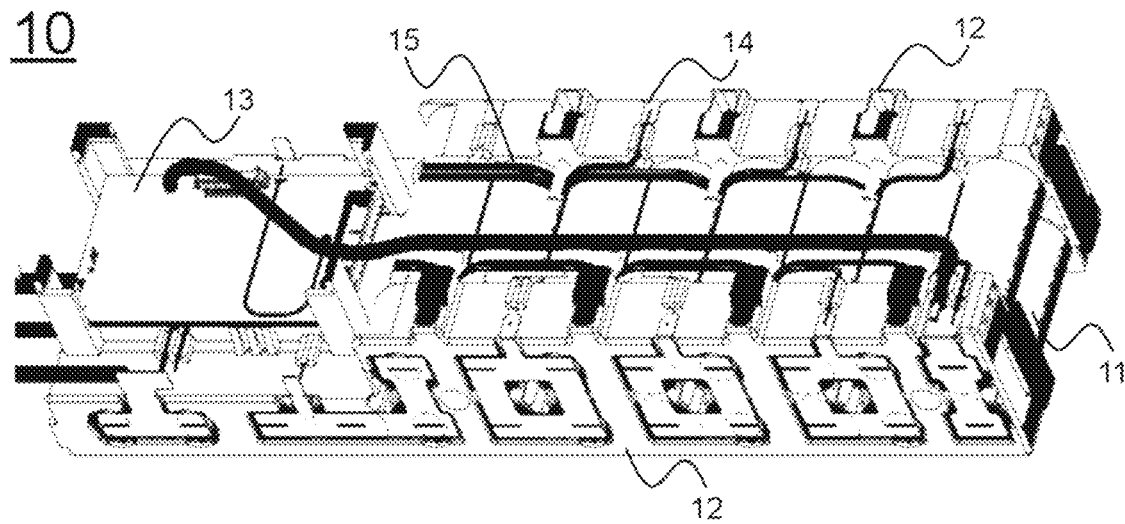
[FIG. 2]
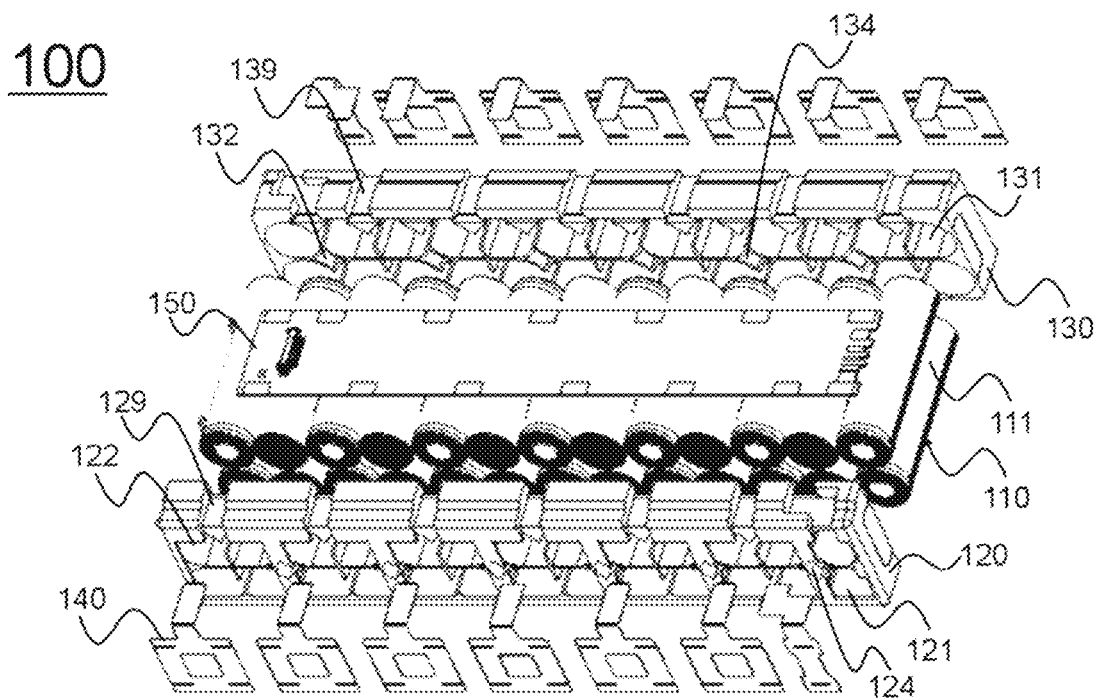

【FIG. 3】
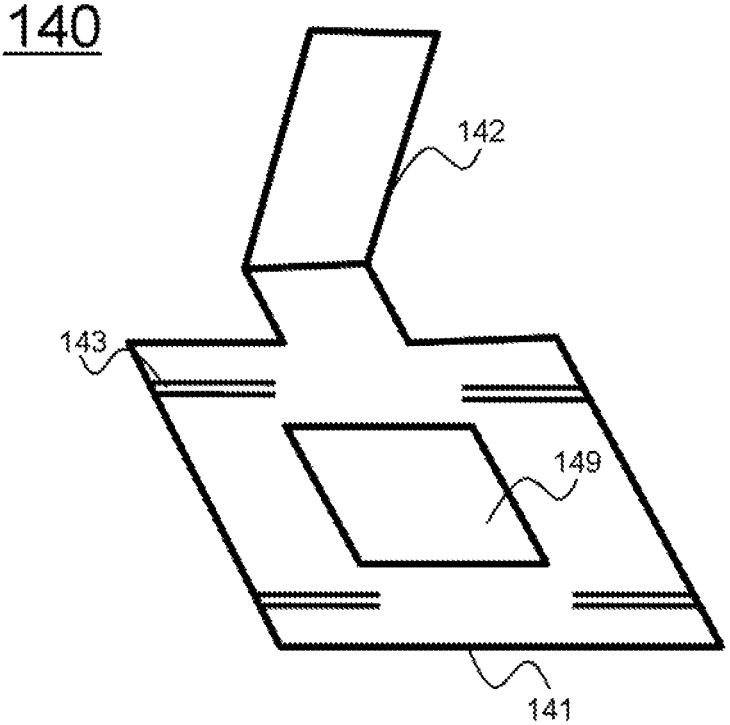
【FIG. 4】
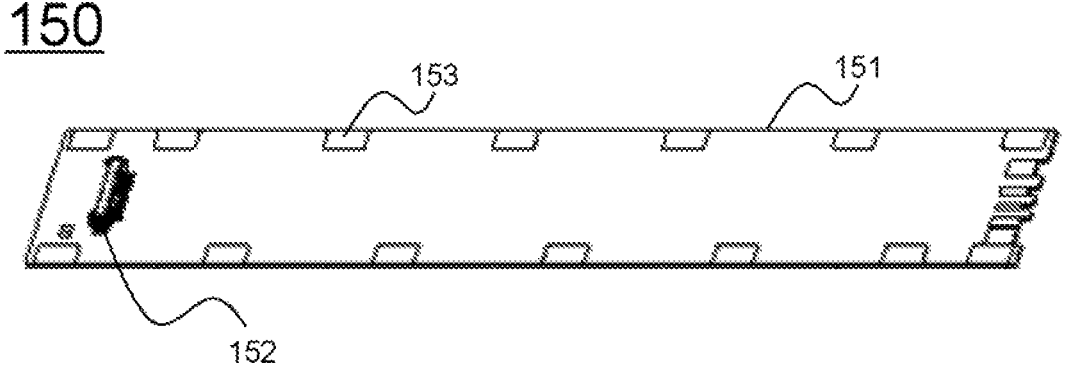

【FIG. 5】
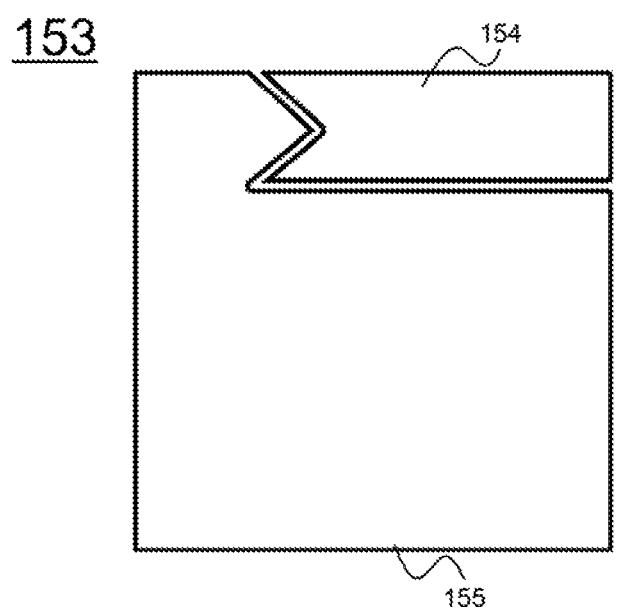

BATTERY MODULE HAVING STRUCTURE IN WHICH BATTERY MANAGEMENT SYSTEM IS DIRECTLY CONNECTED TO TERMINAL PLATES

CROSS-REFERENCE TO RELATED APPLICATIONS

This application claims the benefit of Korean Patent Application No. 10-2015-0102831 filed on Jul. 21, 2015 with the Korean Intellectual Property Office, the disclosure of which is herein incorporated by reference in its entirety.

TECHNICAL FIELD

The present invention relates to a battery module having structure in which a battery management system is directly connected to terminal plates.

BACKGROUND ART

In recent years, a secondary battery, which can be repeatedly charged and discharged, has been widely used as an energy source for wireless mobile devices. In addition, the secondary battery has attracted considerable attention as an energy source for electric vehicles and hybrid electric vehicles, which have been developed to solve problems, such as air pollution, caused by existing gasoline and diesel vehicles that use fossil fuels. As a result, kinds of applications using the secondary battery are being increased owing to advantages of the secondary battery, and hereafter the secondary battery is expected to be applied to more applications and products than now.

Based on the construction of electrodes and an electrolyte, the secondary battery may be classified as a lithium ion battery, a lithium ion polymer battery, or a lithium polymer battery. In particular, the lithium ion polymer battery has been increasingly used because the lithium ion polymer battery has a low possibility of electrolyte leakage and can be easily manufactured.

Based on the shape of a battery case, the secondary battery may also be classified as a cylindrical battery having an electrode assembly mounted in a cylindrical metal can, a prismatic battery having an electrode assembly mounted in a prismatic metal can, or a pouch-shaped battery having an electrode assembly mounted in a pouch-shaped case made of an aluminum laminate sheet.

The secondary battery is being widely used as an energy source for diverse electronic products as well as various kinds of mobile devices. However, various kinds of combustible materials are contained in the secondary battery. As a result, the lithium secondary battery may overheat or explode due to the overcharge of the secondary battery, the overcurrent in the secondary battery, or other external physical impact applied to the secondary battery.

For this reason, the secondary battery is provided with a safety system, such as a protection circuit for interrupting electric current when the secondary battery is overcharged or overdischarged or when overcurrent flows in the secondary battery, a positive temperature coefficient (PTC) element whose resistance greatly increases so as to interrupt electric current when the temperature of the secondary battery increases, or a safety vent for interrupting electric current or exhausting gas when pressure increases due to generation of the gas. Meanwhile, a multi-cell type middle or large-sized battery pack, which is configured to have a multi-cell structure in which a plurality of battery modules is combined, is provided with a safety system, such as a fuse, a bimetal, or a battery management system (BMS), for protecting battery cells from overcharge, overdischarge, or overcurrent.

Voltage sensing terminals are connected to the BMS, which is one of the above-described safety systems, via wires so as to detect voltages of battery cells or unit modules.

FIG. 1 is a typical view showing a conventional battery module having a structure in which a BMS is connected to voltage sensing terminals via wires.

Referring to FIG. 1, a battery module 10 is configured to have a structure in which a plurality of battery cells 11 is arranged in the state in which the battery cells 11 are adjacent to each other laterally, frames 12 are mounted to opposite ends of the battery cells 11, and a BMS 13 is located at the upper side of one end of the battery cells 11.

The BMS 13 is connected to voltage sensing terminals 14 via wires 15. The battery cells 11 are connected to each other in series. It is required for the BMS 13 to monitor voltages of the respective battery cells 11. For this reason, it is necessary for the number of voltage sensing terminals 14 to be equal to the number of battery cells. In addition, it is necessary for the number of wires 15 to be equal to the number of battery cells. In this structure, the voltage sensing terminals 14 and the wires 15 are manually soldered, with the result that the manufacturing process is complicated, and the wires are arranged complicatedly, whereby the structure of the battery module becomes complicated.

Therefore, there is a high necessary for a battery module that is capable of solving the above problems.

DISCLOSURE

Technical Problem

Therefore, the present invention has been made to solve the above problems and other technical problems that have yet to be resolved.

Specifically, it is an object of the present invention to provide a battery module having structure in which a battery management system is directly connected to battery cells without using wires in order to solve various problems, such as the deterioration of the aesthetic appearance of the battery module, the increase in cost of manufacturing the battery module, and the non-uniformity in process of manufacturing the battery module, which may occur when a plurality of voltage sensing terminals and a plurality of wires are soldered so as to be connected to the battery cells.

Technical Solution

In accordance with one aspect of the present invention, the above and other objects can be accomplished by the provision of a battery module including a battery cell stack configured to have a structure in which a plurality of battery cells is arranged such that the battery cells are adjacent to each other laterally, a pair of cell frames mounted to opposite ends of the battery cell stack, terminal plates for electrically connecting electrode terminals of the battery cells to each other, and a battery management system (BMS) mounted to one side surface of the battery cell stack in the state in which the BMS is directly connected to the terminal plates.

In the battery module according to the present invention, the BMS is directly connected to the terminal plates without using wires, thereby solving various problems, such as the deterioration of the aesthetic appearance of the battery module, the increase in cost of manufacturing the battery module, and the non-uniformity in process of manufacturing the battery module, which may occur when the terminal plates are connected to the BMS by soldering.

Specifically, each of the battery cells may be a cylindrical battery cell. The cylindrical battery cell may be configured to have a structure in which a positive electrode sheet, a negative electrode sheet, and a separator sheet interposed between the positive electrode sheet and the negative electrode sheet are wound to form a jelly-roll type electrode assembly, the electrode assembly is received in a cylindrical metal container together with an electrolyte, and a cap assembly is mounted to the upper end of the cylindrical container.

In addition, the battery cell stack may be configured to have a structure in which the size of the battery cell stack in the horizontal direction is greater than the size of the battery cell stack in the vertical direction. Here, the "vertical direction" means the height direction from the ground, and the "horizontal direction" means the direction perpendicular to the direction in which the electrode terminals of the battery cells are formed.

On the other hand, the battery cell stack may be configured to have a structure in which the size of the battery cell stack in the vertical direction is greater than the size of the battery cell stack in the horizontal direction. It is possible to change the shape of each of the terminal plates, which electrically connect the electrode terminals of the battery cells to each other, based on the structure of the battery cell stack.

In an embodiment of the present invention, the cell frames may include a first cell frame to which one end of the battery cell stack is mounted and a second cell frame to which the other end of the battery cell stack is mounted, and the first cell frame and the second cell frame may be coupled to each other using a fastening member. Specifically, the first cell frame and the second cell frame may be provided in corners thereof with fastening holes, through which fastening members may be inserted so as to couple the first cell frame and the second cell frame to each other.

The first cell frame and the second cell frame may be provided in insides thereof with receiving parts, each of which corresponds to one end or the other end of a corresponding one of the battery cells, and openings, through which the electrode terminals of the battery cells are exposed, may be formed in outer surfaces of the first cell frame and the second cell frame. Specifically, each of the battery cells may be a cylindrical battery cell, and therefore each of the receiving parts may be provided with a cylindrical recess. Each of the openings may be formed so as to have a circular shape corresponding to the shape of a corresponding one of the receiving parts.

In addition, through channels, through which a coolant flows, may be defined between the receiving parts of the first cell frame and the second cell frame, and each of the terminal plates may be provided with a through hole, which is aligned with a corresponding one of the through channels in the cell frames. Consequently, the through channels may communicate with the through holes. The coolant, introduced through the through holes of the terminal plates located on one side of the battery module, may pass through the through channels of the first cell frame and the through channels of the second cell frame, and may be discharged through the through holes of the terminal plates located on the other side of the battery module, whereby the battery cells may be cooled. The coolant may be introduced and discharged in the opposite direction.

In an embodiment of the present invention, the terminal plates may be mounted to the outer surfaces of the cell frames in the state in which the terminal plates are connected to the electrode terminals of the battery cells. The terminal plates may be connected to the electrode terminals of the battery cells by soldering such that the terminal plates are mounted to the outer surfaces of the cell frames. Alternatively, it is possible to increase coupling force between the terminal plates and the cell frames through an additional coupling structure. Specifically, hooks may be formed on the cell frames such that the hooks protrude outward from the cell frames, and fastening recesses corresponding to the hooks may be formed in the terminal plates. The terminal plates may be mounted to the cell frames by inserting the hooks into the fastening recesses.

The terminal plates may connect two or more battery cells to each other in series or in series and in parallel.

For example, the battery cells may be connected to each other so as to have a 2P-13S structure.

In an embodiment of the present invention, each of the terminal plates may include a terminal connection part configured to contact a corresponding one of the electrode terminals of the battery cells, the terminal connection part being formed to have a rectangular shape, and a BMS connection part extending from one side of the terminal connection part, the BMS connection part being connected to the BMS in the state in which the BMS connection part is bent perpendicularly from the upper end of a corresponding one of the cell frames toward the BMS.

It is possible to change the shape of the terminal connection part based on the structure in which the battery cells are connected to each other. Specifically, when the number of battery cells connected to each other in parallel is increased, the contact area between the terminal plates and the electrode terminals of the battery cells may be increased.

In addition, the cell frames may be provided in the upper ends thereof with recesses, having a shape corresponding to the BMS connection parts, for guiding bending of the BMS connection parts and fixing the BMS connection parts. In this structure, it is possible to prevent the occurrence of a process error due to the movement of the terminal plates, which may be caused when the terminal plates are connected to the BMS during the manufacture of the battery module, and for a worker to easily bend the terminal plates and to connect the terminal plates to the BMS.

In addition, slits for allowing the terminal connection parts to be welded to the electrode terminals of the battery cells may be formed in the portions of the terminal connection parts corresponding to the electrode terminals of the battery cells. The slits make it easy to connect the terminal connection parts to the electrode terminals of the battery cells by soldering or welding.

In an embodiment of the present invention, the BMS may include a printed circuit board (PCB) mounted to the upper surface of the battery cell stack, the PCB being configured to have a rectangular shape corresponding to the horizontal size of the battery cell stack, an integrated circuit (IC) formed on the PCB, the IC being electrically connected to voltage sensing connection parts for measuring voltages of the battery cells to control the operation of the battery module, and the voltage sensing connection parts arranged along the outer edge of the PCB at intervals so as to be connected to the terminal plates.

Specifically, each of the voltage sensing connection parts may be configured to have a rectangular shape when viewed from above. More specifically, each of the voltage sensing connection parts may be configured to have a structure in which the length of the voltage sensing connection part in the horizontal direction is greater than the length of voltage sensing connection part in the width direction. Here, the "width direction" means the longitudinal direction of each of the battery cells.

In a concrete embodiment, each of the voltage sensing connection parts may include a first contact part configured to contact a corresponding one of the terminal plates and a second contact part electrically connected to the IC in the state in which the second contact part is electrically disconnected from the first contact part, and the first contact part and the second contact part may be soldered to a corresponding one of the terminal plates such that the terminal plate is electrically connected to the IC.

When the voltage sensing connection parts are connected to the terminal plates, unintentional contact between the voltage sensing connection parts and the terminal plates may repeatedly occur due to the movement of the terminal plates. As a result, the IC may be damaged due to the repeated unintentional contact between the voltage sensing connection parts and the terminal plates.

In order to solve this problem, as in the above embodiment, each of the voltage sensing connection parts may include a first contact part and a second contact part, which are disconnected from each other, and the first contact part and the second contact part may be connected to corresponding one of the terminal plates by soldering, thereby preventing damage to the IC due to unintentional contact between the voltage sensing connection parts and the terminal plates.

In accordance with another aspect of the present invention, there is provided a battery pack including the battery module.

In accordance with a further aspect of the present invention, there is provided a device including the battery pack as a power source.

The device may be any one selected from the group consisting of an electric bicycle, an electric vehicle, a hybrid electric vehicle, a plug-in hybrid electric vehicle, and a power storage apparatus.

The structure and manufacturing method of the device are well known in the art to which the present invention pertains, and a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a typical view showing a conventional battery module having a structure in which a battery management system (BMS) is connected to voltage sensing terminals via wires;

FIG. 2 is an exploded view showing a battery module according to an embodiment of the present invention;

FIG. 3 is an enlarged view showing a terminal plate of the battery module of FIG. 2;

FIG. 4 is an enlarged view showing a BMS of the battery module of FIG. 2; and

FIG. 5 is an enlarged view showing a voltage sensing connection part of the battery module of FIG. 2.

BEST MODE

Now, exemplary embodiments of the present invention will be described in detail with reference to the accompanying drawings. It should be noted, however, that the scope of the present invention is not limited by the illustrated embodiments.

FIG. 2 is an exploded view typically showing a battery module according to an embodiment of the present invention, FIG. 3 is an enlarged view typically showing a terminal plate of the battery module of FIG. 2, and FIG. 4 is an enlarged view typically showing a battery management system (BMS) of the battery module of FIG. 2.

Referring to FIGS. 2 to 4, a battery module 100 includes a battery cell stack 110, a first cell frame 120, a second cell frame 130, terminal plates 140, and a BMS 150.

The battery cell stack 110 is configured to have a structure in which cylindrical battery cells 111 are stacked and arranged such that the battery cells 111 are adjacent to each other laterally. The battery cell stack 110 is configured to have a structure in which the horizontal size of the battery cell stack 110 is greater than the vertical size of the battery cell stack 110. The battery cells 111 are arranged in the state in which electrode terminals of the battery cells 111 are opposite each other such that the battery cells 111 has a 2P-13S structure.

The first cell frame 120 and the second cell frame 130 are mounted to opposite ends of the battery cell stack 110. The first cell frame 120 and the second cell frame 130 may be coupled to each other using a fastening member (not shown).

The first cell frame 120 and the second cell frame 130 are provided in insides thereof with cylindrical receiving parts 121 and 131, each of which corresponds to one end or the other end of a corresponding one of the battery cells 111. In addition, openings 122, through which electrode terminals of the battery cells 111 are exposed, are formed in the outer surfaces of the first cell frame 120 and the second cell frame 130.

The BMS 150 is located on the upper end surface of the battery cell stack 110. The terminal plates 140 are mounted to the outer surfaces of the first cell frame 120 and the second cell frame 130 in the state in which the terminal plates 140 are connected to the electrode terminals of the battery cells 111.

In addition, through channels 124 and 134, through which a coolant may flow, are defined between the receiving parts 121 and 131 of the first cell frame 120 and the second cell frame 130. Each of the terminal plates 140 are provided with a through hole 149, which is aligned with a corresponding one of the through channels 124 and 134.

The through channels 124 and 134 communicate with the through holes 149. A coolant, introduced through the through holes 149 of the front terminal plates 140, passes through the through channels 123 of the first cell frame 120 and the through channels 134 of the second cell frame 130, and is discharged through the through holes 149 of the rear terminal plates 140, whereby the battery cells 111 are cooled.

Each of the terminal plates 140 includes a terminal connection part 141 and a BMS connection part 142. The terminal connection part 141 contacts a corresponding one of the electrode terminals of the battery cells 111. The terminal connection part 141 is formed to have a rectangular shape. The BMS connection part 142 extends from the upper side of the terminal connection part 141. The BMS connection parts 142 are bent perpendicularly from the upper ends of the cell frames 120 and 130 toward the BMS 150.

The cell frames 120 and 130 are provided in the upper ends thereof with recesses 129 and 139, which have a shape corresponding to the BMS connection parts 142, for guiding the bending of the BMS connection parts 142 and fixing the BMS connection parts 142.

Slits 143 for allowing the terminal connection parts 141 to be easily soldered or welded to the electrode terminals of the battery cells 111 are formed in the portions of the terminal connection parts 141 corresponding to the electrode terminals of the battery cells 111.

The BMS 150 includes a printed circuit board (PCB) 151, an integrated circuit (IC) 152, and voltage sensing connection parts 153.

The PCB 151 is mounted to the upper surface of the battery cell stack 110. The PCB 151 is configured to have a rectangular shape corresponding to the horizontal size of the battery cell stack 111.

The IC 152 is formed on the PCB 151. The IC 152 is electrically connected to the voltage sensing connection parts 153 for measuring voltages of the battery cells 111 to control the operation of the battery module.

The voltage sensing connection parts 153 are arranged along the outer edge of the PCB 151 at intervals so as to be connected to the terminal plates 140.

FIG. 5 is an enlarged plan view showing one of the voltage sensing connection parts of the battery module of FIG. 2.

Referring to FIG. 5 together with FIG. 2, the voltage sensing connection part 153 includes a first contact part 154 and a second contact part 155.

The first contact part 154 is configured to contact each of the terminal plates 140, and the second contact part 155 is electrically connected to the IC 152 in the state in which the second contact part 155 is electrically disconnected from the first contact part 154.

The first contact part 154 and the second contact part 155 are soldered to each of the terminal plates 140 such that the terminal plate 140 is electrically connected to the IC 152.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery module according to the present invention includes a battery management system (BMS) directly connected to terminal plates without using wires, thereby solving various problems, such as the deterioration of the aesthetic appearance of the battery module, the increase in cost of manufacturing the battery module, and the non-uniformity in process of manufacturing the battery module, which may occur when the terminal plates are connected to the BMS by soldering.

The invention claimed is:

1. A battery module comprising:
a battery cell stack configured to have a structure in which a plurality of battery cells is arranged such that the battery cells are adjacent to each other laterally;
a pair of cell frames mounted to opposite ends of the battery cell stack;
terminal plates for electrically connecting electrode terminals of the battery cells along opposite ends of the battery cell stack to each other; and
a battery management system (BMS) mounted to one side surface of the battery cell stack in a state in which the BMS is directly connected to all of the terminal plates without wires, the BMS having a board structure arranged in a plane perpendicular to the terminal plates, the BMS including:
a printed circuit board (PCB) mounted to an upper surface of the battery cell stack, the PCB being configured to have a rectangular shape corresponding to a horizontal size of the battery cell stack;
an integrated circuit (IC) formed on the PCB, the IC being electrically connected to voltage sensing connection parts for measuring voltages of the battery cells to control an operation of the battery module; and
the voltage sensing connection parts arranged along an outer edge of the PCB at intervals so as to be connected to the terminal plates, wherein each of the voltage sensing connection parts includes:
a first contact part configured to contact a corresponding one of the terminal plates; and
a second contact part electrically connected to the IC in a state in which the second contact part is entirely spaced from the first contact part,
wherein the pair of cell frames are located between the battery cell stack and the terminal plates,
wherein each battery cell of the plurality of battery cells is connected to one of the terminal plates,
wherein the cell frames comprise a first cell frame to which one end of the battery cell stack is mounted and a second cell frame to which the other end of the battery cell stack is mounted, and the first cell frame and the second cell frame are coupled to each other using a fastening member,
wherein the first contact part and the second contact part are soldered to a corresponding one of the terminal plates such that the terminal plate is electrically connected to the IC, and
wherein the corresponding one of the terminal plates includes a portion that is folded over an outer edge of the first contact part, which is an outer edge of the voltage sensing connection part, and directly contacting the first contact part.

2. The battery module according to claim 1, wherein each of the battery cells is a cylindrical battery cell.

3. The battery module according to claim 1, wherein the battery cell stack is configured to have a structure in which a horizontal size of the battery cell stack is greater than a vertical size of the battery cell stack.

4. The battery module according to claim 1, wherein the first cell frame and the second cell frame are provided in insides thereof with receiving parts, each of which corresponds to one end or the other end of a corresponding one of the battery cells, and openings, through which the electrode terminals of the battery cells are exposed, are formed in outer surfaces of the first cell frame and the second cell frame.

5. The battery module according to claim 4, wherein through channels, through which a coolant flows, are defined between the receiving parts of the first cell frame and the second cell frame.

6. The battery module according to claim 5, wherein each of the terminal plates are provided with a through hole, which is aligned with a corresponding one of the through channels in the cell frames.

7. The battery module according to claim 1, wherein the terminal plates are mounted to outer surfaces of the cell frames in a state in which the terminal plates are connected to the electrode terminals of the battery cells.

8. The battery module according to claim 7, wherein the terminal plates connect two or more battery cells to each other in series or in series and in parallel.

9. The battery module according to claim 8, wherein the battery cells are connected to each other so as to have a 2P-13S structure.

10. The battery module according to claim 7, wherein each of the terminal plates comprises:
a terminal connection part configured to contact a corresponding one of the electrode terminals of the battery cells, the terminal connection part being formed to have a rectangular shape; and
a BMS connection part extending from one side of the terminal connection part, the BMS connection part being connected to the BMS in a state in which the BMS connection part is bent perpendicularly from an upper end of a corresponding one of the cell frames toward the BMS.

11. The battery module according to claim 10, wherein the cell frames are provided in the upper ends thereof with recesses, having a shape corresponding to the BMS connection parts, for guiding bending of the BMS connection parts and fixing the BMS connection parts.

12. The battery module according to claim 10, wherein slits for allowing the terminal connection parts to be welded to the electrode terminals of the battery cells are formed in portions of the terminal connection parts corresponding to the electrode terminals of the battery cells.

13. The battery module according to claim 1, wherein each of the voltage sensing connection parts is configured to have a rectangular shape when viewed from above.

14. A battery pack comprising a battery module according to claim 1.

15. A device comprising a battery pack according to claim 14.

16. The device according to claim 15, wherein the device is an electric bicycle, an electric vehicle, a hybrid electric vehicle, or a plug-in hybrid electric vehicle.

17. A battery module comprising:
a battery cell stack configured to have a structure in which a plurality of battery cells is arranged such that the battery cells are adjacent to each other laterally;
a pair of cell frames mounted to opposite ends of the battery cell stack;
terminal plates at each of the pair of cell frames for electrically connecting electrode terminals of the battery cells to each other; and
a battery management system (BMS) mounted to one side surface of the battery cell stack in a state in which the BMS is directly connected to all of the terminal plates, the BMS having a board structure arranged in a plane perpendicular to the terminal plates, the BMS including:
a printed circuit board (PCB) mounted to an upper surface of the battery cell stack, the PCB being configured to have a rectangular shape corresponding to a horizontal size of the battery cell stack;
an integrated circuit (IC) formed on the PCB, the IC being electrically connected to voltage sensing connection parts for measuring voltages of the battery cells to control an operation of the battery module; and
the voltage sensing connection parts arranged along an outer edge of the PCB at intervals so as to be connected to the terminal plates, wherein each of the voltage sensing connection parts includes:
a first contact part configured to contact a corresponding one of the terminal plates; and
a second contact part electrically connected to the IC in a state in which the second contact part is entirely spaced from the first contact part,
wherein each of the terminal plates comprises:
a terminal connection part configured to contact a corresponding one of the electrode terminals of the battery cells, the terminal connection part being formed to have a rectangular shape; and
a BMS connection part extending from one side of the terminal connection part, the BMS connection part being connected to the BMS in a state in which the BMS connection part is bent perpendicularly from an upper end of a corresponding one of the cell frames toward the BMS,
wherein the cell frames are provided in the upper ends thereof with recesses, having a shape corresponding to the BMS connection parts, for guiding bending of the BMS connection parts and fixing the BMS connection parts,
wherein each battery cell of the plurality of battery cells is connected to one of the plates,
wherein the cell frames comprise a first cell frame to which one end of the battery cell stack is mounted and a second cell frame to which the other end of the battery cell stack is mounted, and the first cell frame and the second cell frame are coupled to each other using a fastening member,
wherein the first contact part and the second contact part are soldered to a corresponding one of the terminal plates such that the terminal plate is electrically connected to the IC, and
wherein the BMS connection of part of the corresponding one of the terminal plates is folded over an outer edge of the first contact part, which is an outer edge of the voltage sensing connection part, and directly contacts the first contact part.

* * * * *